US009810149B2

(12) United States Patent
Hoogland et al.

(10) Patent No.: US 9,810,149 B2
(45) Date of Patent: Nov. 7, 2017

(54) PROCESS TO OBTAIN A COMPRESSED GAS

(71) Applicant: ICE INDUSTRIAL PROPERTIES BV, Nieuw-Vennep (NL)

(72) Inventors: Johannes Arjen Hoogland, Hoofddorp (NL); George Johannes Kruijer, Hoofddorp (NL)

(73) Assignee: ICE INDUSTRIAL PROPERTIES BV, Nieuw-Vennep (NL)

( * ) Notice: Subject to any disclaimer, the term of this patent is extended or adjusted under 35 U.S.C. 154(b) by 419 days.

(21) Appl. No.: 14/378,205

(22) PCT Filed: Feb. 15, 2013

(86) PCT No.: PCT/NL2013/050087
§ 371 (c)(1),
(2) Date: Aug. 12, 2014

(87) PCT Pub. No.: WO2013/125948
PCT Pub. Date: Aug. 29, 2013

(65) Prior Publication Data
US 2015/0000295 A1 Jan. 1, 2015

(30) Foreign Application Priority Data
Feb. 24, 2012 (NL) .................................... 2008340

(51) Int. Cl.
*F02C 7/10* (2006.01)
*F02C 1/04* (2006.01)
(Continued)

(52) U.S. Cl.
CPC .................. *F02C 7/10* (2013.01); *F02C 1/04* (2013.01); *F02C 7/08* (2013.01); *F02C 7/105* (2013.01)

(58) Field of Classification Search
CPC ...... F02C 7/10; F02C 1/04; F02C 3/02; F02C 6/16; F02C 6/06; F02C 6/18;
(Continued)

(56) References Cited

U.S. PATENT DOCUMENTS 5,507,141 A * 4/1996 Stigsson ................ D21C 11/12
162/30.11
2006/0048920 A1 * 3/2006 Helleur ................... F01K 3/185
165/108

(Continued)

FOREIGN PATENT DOCUMENTS

BE 1016500 A7 12/2006

*Primary Examiner* — Christopher Demeree
(74) *Attorney, Agent, or Firm* — Nixon Peabody LLP

(57) ABSTRACT

The invention is directed to a process to obtain a compressed gas starting from a starting gas having a lower pressure by performing the following steps: (i) increasing the pressure and temperature of a gas having an intermediate pressure by means of indirect heat exchange against a fluid having a higher temperature to obtain a gas high in pressure and temperature, (ii) obtaining part of the gas high in temperature and pressure as the compressed gas, (iii) using another part of the gas high in temperature and pressure as a driving gas to increase the pressure of the starting gas in one or more stages to obtain the gas having an intermediate pressure for use in step (i). The invention is also directed to a configuration wherein the process can be performed and directed to a process to generate energy using the process.

19 Claims, 3 Drawing Sheets

(51) Int. Cl.
*F02C 7/08* (2006.01)
*F02C 7/105* (2006.01)
(58) Field of Classification Search
CPC .......... F05D 2220/72; F01K 3/18; F01K 3/20; F01K 3/22; F01K 3/262; F01K 23/101; F01K 23/106; F01K 23/108
USPC ..... 60/772, 783, 726, 39.511; 165/108, 279, 165/104.11, 104.18, 104.19, 104.21, 165/104.22, 104.25, 104.27, 104.28, 165/104.32, 104.33
See application file for complete search history.

(56) References Cited

U.S. PATENT DOCUMENTS

| | | | | |
|---|---|---|---|---|
| 2006/0277915 A1* | 12/2006 | Iwasaki | ................... | F01D 25/12 60/772 |
| 2008/0216510 A1* | 9/2008 | Vandor | ................... | F02C 6/16 62/600 |
| 2011/0036097 A1 | 2/2011 | Lebas | | |

* cited by examiner

PROCESS TO OBTAIN A COMPRESSED GAS

FIELD OF THE INVENTION

The invention is directed to a process to obtain a compressed gas starting from a starting gas having a lower pressure.

CROSS-REFERENCE TO RELATED APPLICATIONS

This Application is a 35 U.S.C. §371 National Phase Entry Application of International Application No. PCT/NL2013/050087 filed Feb. 15, 2013, which designates the Netherlands, the application of which claims benefit of NL Application No. 2008340, filed on Feb. 24, 2012, the contents of each of which are herein incorporated by reference in their entirety.

BACKGROUND OF THE INVENTION

Compressing gas is a well known process. Typically compressors are used to compress a gas. Gas compression is for example part of a gas turbine process to generate power. US-A-2011/0088404 describes a process wherein air is compressed in a gas compressor. The compressed air is combusted with a fuel and the resulting hot process gas is expanded in an expander. The expander is coupled to a device to convert the rotational energy to power, e.g. electrical power. The energy required to operate the compressor is typically delivered by the rotational energy of the expander by a direct coupling of the compressor and the expander as shown in FIG. 1 of this publication. This publication also describes the use of a source of waste heat to be used to heat partially compressed air as obtained in the compressor. This heated air is used to generate additional power in a lower pressure expansion stage.

BE1016500 describes a process wherein air is compressed in several compression stages. The compressed air is used in a combustion turbine. Before being compressed the air is heated using heat recovery from the exhaust gas of the turbine.

US2011/036097 describes a rotary regenerative heat exchanger for heat exchange between a compressed gas and the exhaust gas of a combustor.

A disadvantage of a traditional gas turbine process as illustrated above is that a large compressor is required. A further disadvantage is that the energy to operate the compressor is provided by the rotational energy of the expanders of the gas turbine. Thus part of the energy obtained in the expanders is used for compressing the combustion air. This coupled system makes the gas turbine process expensive and less efficient. It is an object of the present invention to provide an alternative process for compressing a gas.

SUMMARY OF THE INVENTION

This invention is directed to a process to obtain a compressed gas starting from a starting gas having a lower pressure by performing the following steps:
(i) increasing the pressure and temperature of a gas having an intermediate pressure by means of indirect heat exchange against a fluid having a higher temperature to obtain a gas high in pressure and temperature
(ii) obtaining part of the gas high in temperature and pressure as the compressed gas,
(iii) using another part of the gas high in temperature and pressure as a driving gas to increase the pressure of the starting gas in one or more stages to obtain the gas having an intermediate pressure for use in step (i).

Applicants found that the process according to the invention a gas can be compressed by making use of a fluid having an elevated temperature. A further advantage is that a compressed gas can be obtained having a higher temperature than the starting gas. This process can advantageously be used in combination with for example a gas turbine, wherein the process according to the invention is used to further compress a partially compressed air flow as obtained in the compressor of a gas turbine process. This is advantageous, because such a set-up would require a smaller air compressor and by consequence a smaller expander to generate the same amount of power as compared to a gas turbine process not using the new process.

The invention is thus also directed to a process to generate electrical power by means of a gas turbine, wherein said gas turbine uses a fuel and a compressed oxygen comprising gas as feed and wherein the following steps are performed,
(a) compressing an oxygen comprising gas by means of a compressor,
(b) further compressing said oxygen containing gas by means of a process as described above,
(c) combusting the fuel with the compressed oxygen containing gas obtained in step (b) to obtain a pressurised combustion gas and
(d) expanding said combustion gas in an expander of a gas turbine generating electrical power.

The invention is also directed to a configuration comprising 2n+4 or more interconnected vessels, wherein n is 2 or more, each vessel having an inlet and an outlet connected to a distributer, wherein the distributer is further provided with an inlet to receive a starting gas, an outlet to discharge a compressed gas, an inlet and outlet connected to an outlet and inlet of a heat exchanger, an outlet to discharge a remaining driving gas and an inlet to supply a purging gas, wherein the distributor fluidly connects:
the inlet to receive a starting gas to the inlet of a vessel of said configuration;
the outlet to discharge a compressed gas to the outlet of another vessel of said configuration;
the outlet and inlet of the heat exchanger to the outlet and inlet of another vessel of said configuration;
the outlet to discharge a remaining driving gas to the outlet of another vessel of said configuration;
at least one outlet of one other vessel of said configuration to an inlet of another vessel of said configuration.

The above configuration is suited to perform the process to obtain a compressed gas as described above.

Further advantages and preferred embodiments will be described below.

DETAILED DESCRIPTION OF THE INVENTION

Figure 1:
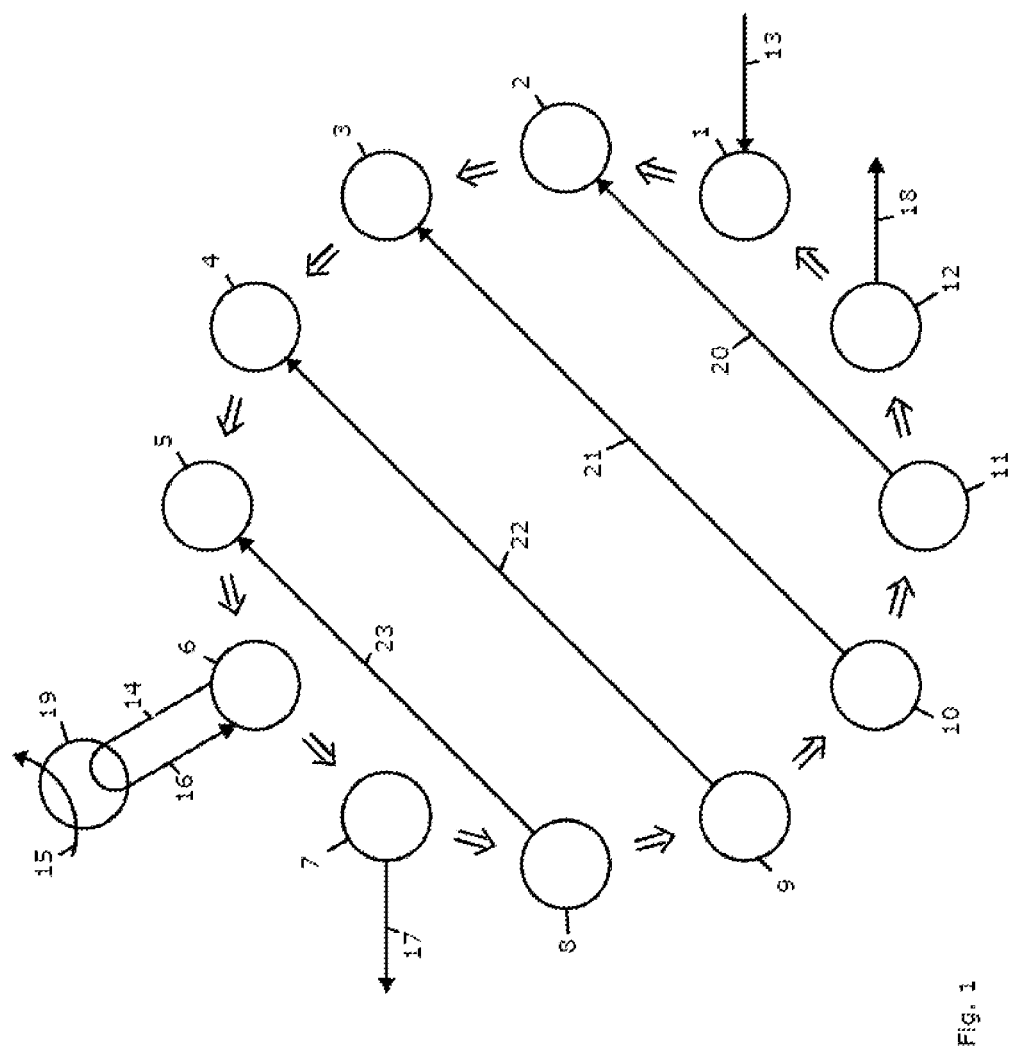
FIG. 1 is a schematic illustration of the process according to the invention.

The invention is directed to a process to obtain a compressed gas starting from a starting gas making use of the energy contained in the fluid having a higher temperature. This source of energy is different from the rotational energy required to operate a compressor, which is either electrically powered or coupled to an expander as in US-A-2011/0088404. Fluids having an elevated temperature for use in step (i) may be exhaust gasses from other processes, exhaust gas from a melting furnaces, gas turbine, gas or diesel engines, incinerators or combinations of said fluids either used in admixture or sequential. A possible fluid may be, optionally partially, generated by on-purpose combustion of a fuel. Possible fuels are hydrogen, synthesis gas or solid, fluid or gaseous carbonaceous fuels, for example natural gas, refinery off-gas, a biomass solid, fluid or gas fuel, a domestic waste fuel, crude oil derived fuel, e.g. kerosene, diesel fuel or bunker fuel. Suitably a mixture comprising an exhaust gas from another process and the combustion gasses generated by this on-purpose combustion of a fuel is used as the fluid having the elevated temperature in step (i).

The starting gas is preferably an oxygen comprising gas for use as feed component of a combustor as part of a gas turbine. In this preferred embodiment part of the fluid having a higher temperature is comprised of the exhaust gas of the expander of the gas turbine.

The temperature of the starting gas is suitably as low as possible, preferably below 50° C. and even more preferably below 20° C. Low temperature is advantageous because it increases the capacity of a given apparatus in which the process of this invention can be performed. The pressure of the starting gas may be between 0.1 and 0.6 MPa. If the starting gas is an oxygen comprising gas for use as feed component of a combustor as part of a gas turbine it is preferred that the starting gas has a pressure of between 0.11 and 0.6 MPa, preferably obtained in a compressor.

The gas having an intermediate pressure as used in step (i) may have a pressure of between 0.2 and 3 MPa. In step (i) the pressure and temperature of a gas having an intermediate pressure is increased by means of indirect heat exchange against the fluid having a higher temperature to obtain a gas high in pressure and temperature. This indirect heat exchange may be performed by processes well known to the skilled person. Preferably the gas having an intermediate pressure is kept within an enclosed space for a certain period of time wherein the heat exchange is performed such to more optimally increase both temperature and pressure in step (i). The temperature of the fluid is preferably between 100 and 600° C. and more preferably between 250 and 400° C.

In step (ii) part of the gas high in temperature and pressure is obtained as the compressed gas. The pressure of the compressed gas is suitably between 0.14 and 3 MPa. The temperature is suitably between 50 and 550° C. The pressure increase is preferably between 0.04 and 2.5 MPa.

In step (iii) another part of the gas high in temperature and pressure is used as a driving gas to increase the pressure of the starting gas in one or more stages to obtain the gas having an intermediate pressure for use in step (i). With the term 'driving gas' is here meant a gas having a higher pressure which is mixed with a gas having a lower pressure. With the term 'using as driving gas' is meant that the driving gas is added to another gas having a lower pressure resulting in a mixed gas composition having a pressure between the pressure of the driving gas and the pressure of the other gas. Preferably the pressure of the starting gas is increased in step (iii) in n levelling stages, wherein n is 2 or more. In this process part of the driving gas is added to the gas obtained in the (n−1)th levelling stage to increase the pressure of said gas in the nth levelling stage to obtain the gas having an intermediate pressure. Part of the remaining driving gas is added to the gas obtained in the (n−2)th levelling stage in the (n−1)th levelling stage. This sequence of adding part of the remaining driving gas to the gas obtained in the previous stage is continued for the remaining (n−2) levelling stages and adding the then remaining driving gas to the starting gas in the 1st levelling stage. If in the above process driving gas remain after performing this 1st levelling stage it is suitably discharged. The number n is suitably between 2 and 50 and preferably from 4 to and including 20.

Preferably steps (i)-(iii) are continuously repeated to obtain a continuous flow of compressed gas. Preferably one cycle of steps (i)-(iii) is performed between 1 and 2000 times per minute.

The above process is preferably performed making use of interconnected vessels. Each vessel is at one moment in a state. In a configuration of 2n+4 or more interconnected vessels, wherein n is the number of levelling stages, at least 2n+4 vessels are each in a different state. The different states are State 1 to State 2n+4:

State 1 is a filling state,

State 2 to State (n+1) is a state wherein the content of the vessel increases in pressure by levelling, State (n+2) is a heat exchange state wherein step (i) of the process of the invention takes place, State (n+3) is a product gas discharge state wherein part of the vessel content is discharged according to step (ii) of the process of the invention and wherein a part of the vessel content remains in the vessel, State (n+4) to State (2n+3) are states wherein a part of the content of the vessel in State (n+4) to State (2n+3) is used to level with the vessels in State 2 to State (n+1) as in step (iii) of the process according to the invention, and State (2n+4) wherein the remaining driving gas is discharged from the vessel.

The vessels of the process continuously change their state from State 1 to State (2n+4) after which they return to State 1. In this manner steps (i)-(iii) are continuously repeated to obtain a continuous flow of compressed gas.

As described above State (n+4) to State (2n+3) are states wherein a part of the content of the vessel in State (n+4) to State (2n+3) is used to level with the vessels in State 2 to State (n+1). Because levelling suitably is performed making use of the pressure difference a vessel in State (n+4) will level with the vessel in State (n+1), the vessel in State (n=5) will level with the vessel in State (n), wherein this is repeated until the vessel in State (2n+3) levels with the vessel in State (2).

The above process is illustrated by FIG. 1, which shows for a configuration in which simultaneously 4 levelling stages take place (n=4). The situation for a single cycle is shown. In FIG. 1 a starting gas 13 is added to a vessel 1 in State 1. Part of the remaining driving gas of vessel 11 in State 11 is added via connecting conduit 20 to vessel 2 in State 2 in first levelling stage thereby increasing the pressure of the gas in vessel 2. Part of the remaining driving gas of vessel 10 in State 10 is added via connecting conduit 21 to the vessel 3 in State 3 in a second levelling stage. Part of the remaining driving gas in vessel 9 in State 9 is added via connecting conduit 22 to the vessel 4 in a third levelling stage. Part of the remaining driving gas in the vessel 8 is added via connecting conduit 23 to the vessel 5 in a fourth levelling stage. In the same cycle the contents of the vessel 6 in State 6 is increased in temperature by discharging the contents of said vessel via conduit 14 to an indirect heat exchanger 19 wherein the gas is heated against fluid 15 to obtain a gas 16 high in temperature and pressure. The vessel 6 in State 6 is filled with the gas 16 high in temperature and pressure. From the vessel 7 in State 7 part 17 of the resulting gas high in temperature and pressure is discharged from said vessel 7 as the compressed gas. From the vessel 12 in State 12 the remaining driving gas 18 is discharged from the vessel. In a next cycle this specific vessel will change to State 1 and is ready to be filled again. Simultaneously the state of all the remaining vessels will change to the next state. In such a cycle the vessels move one position counter clockwise in FIG. 1, as illustrated by the arrows, wherein the supply, discharge and connecting conduits 13, 14, 16, 17, 18, 20, 21, 22 and 23 remain in position. This means that in a next cycle step the supply, discharge and connecting conduits 13, 14, 16, 17, 18, 20, 21, 22 and 23 physically connect to a different vessel. By performing these cycles one after the other a continuous process is obtained to increase the pressure of the starting gas.

The process described above may be performed in a configuration described below. The invention is also directed to such a configuration.

Configuration comprising 2n+4 or more interconnected vessels, wherein n is 2 or more, each vessel having an inlet and an outlet connected to a distributer, wherein the distributor is further provided with an inlet to receive a starting gas, an outlet to discharge a compressed gas, an inlet and outlet connected to an outlet and inlet of a heat exchanger, an outlet to discharge a remaining driving gas and an inlet to supply a purging gas, wherein the distributor fluidly connects:

the inlet to receive a starting gas to the inlet of a vessel of said configuration;
the outlet to discharge a compressed gas to the outlet of another vessel of said configuration;
the outlet and inlet of the heat exchanger to the outlet and inlet of another vessel of said configuration;
the outlet to discharge a remaining driving gas to the inlet of another vessel of said configuration;
at least one outlet of one other vessel of said configuration to an inlet of another vessel of said configuration.

The distributor is preferably comprised of an intermediate part and two end flanges at its two opposite ends, wherein the intermediate part is provided with channels and wherein the intermediate part is rotationally moveable relative to the two end flanges. The first and second flanges are provided with channels connected to the inlet and outlets of the distributor. Part of the channels of a flange communicate with other channels of the same flange via the channels present in the intermediate part at a certain rotational position of the intermediate member relative to the flange. At different rotational positions of the intermediate part a channel in one flange may communicate with a different channel in said same flange. In this manner one vessel may, for example, at certain rotational position be connected to the inlet to receive the starting gas. In a next rotational position the inlet of the same vessel may be connected to receive part of the driving gas as discharged from another vessel. In this manner the process according to the invention may be performed.

Suitably the moveable intermediate part is mechanically connected to an external driving means for achieving the rotational movement when in use. Examples of suitable driving means are electrically driven motors, hydraulically driven motors and fuel combustion driven motors.

Figure 2:
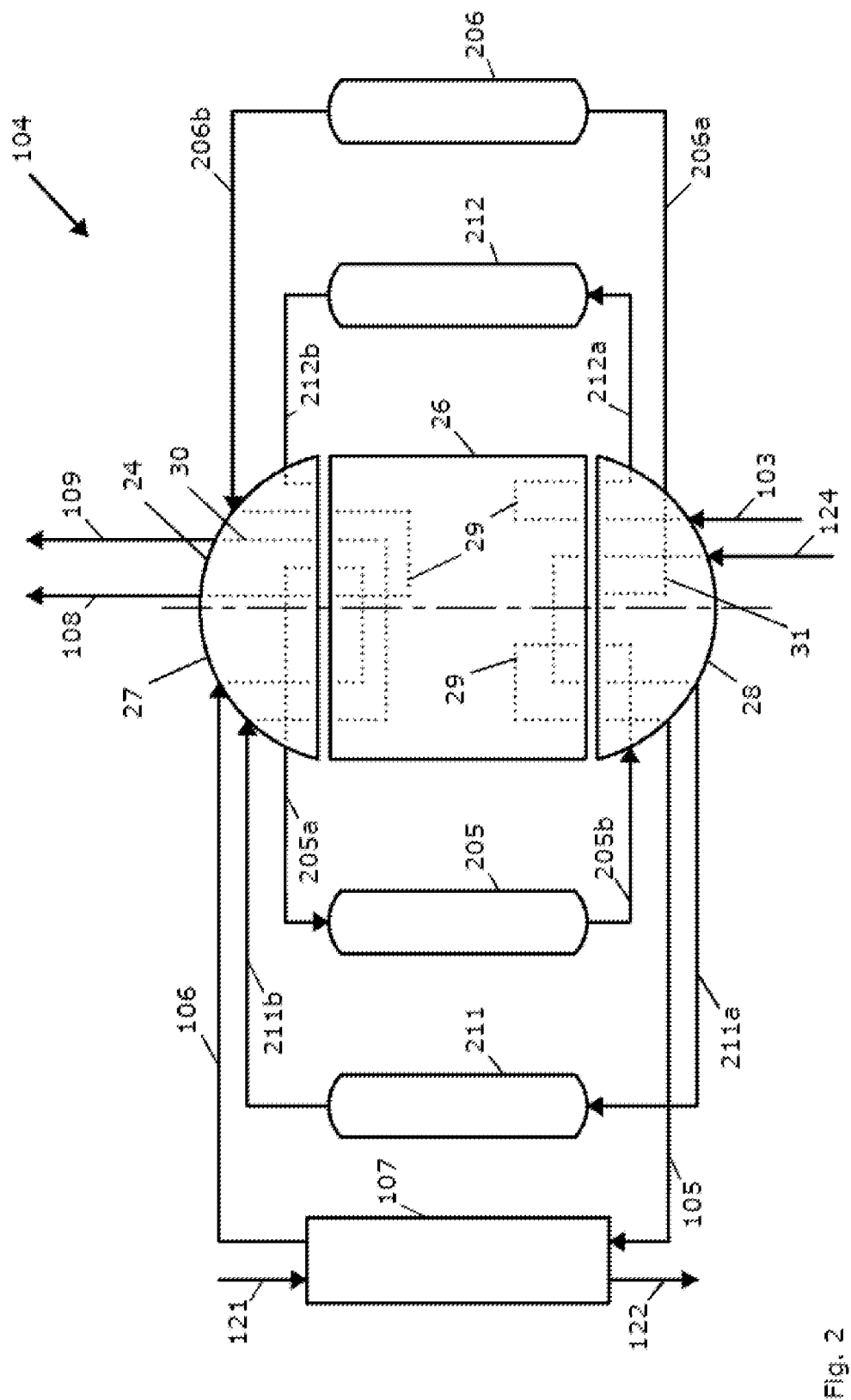
FIG. 2 shows a distributor and part of the vessels of a configuration according to the invention.

The above configuration is illustrated by FIG. 2. FIG. 2 shows a configuration 104 consisting of a distributor 24, interconnected vessels 211, 205, 212 and 206 and a heat exchanger 107. Vessel 212 is operating in State 1 (FIG. 1), vessel 211 is operating in State 12 (FIG. 1), vessel 205 is operating in State 6 (FIG. 1) and vessel 206 is operating in state 7 (FIG. 1). Vessels operating in other states illustrated in FIG. 1 are not shown in FIG. 2 for clarity reasons.

Each vessel 211, 205, 212 and 206 has an inlet and an outlet connected to distributer 24 by means of lines 211a, 211b, 205a, 205b, 212a, 212b, 206a and 206b respectively. The distributer 24 is provided with an inlet to receive a starting gas as supplied via line 103 and an outlet to discharge a compressed gas via line 108. The distributor 24 has an inlet and outlet connected to an outlet and inlet of a heat exchanger 107 via lines 106 and 105 respectively. The distributor has an outlet to discharge a remaining driving gas via line 109 and an inlet to supply a purging gas via line 124.

The distributor 24 has an intermediate part 26 and two end ends a flange 27, 28 at its two opposite ends. The intermediate part 26 is suitably a cylindrical part. The part 26 is provided with channels 29. The intermediate part 26 is rotationally moveable relative to the two end flanges. Preferably the intermediate part 26 rotates within a housing (not shown). The, preferably tubular, housing connects the first and second flange 27 and 28. The first and second flanges 27, 28 are provided with channels 30, 31 connected to the inlet and outlets of the distributor 24. Part of the channels 30 of flange 27 communicate with other channels 30 of the same flange 27 via the channels 29 present in the intermediate part 26 at a certain rotational position of the intermediate member 26 relative to the flange 27.

In FIG. 2 it is shown that distributor 24 fluidly connects the inlet line for starting gas 103 with a vessel 212 via channels 31 in flange 28, channels 29 in intermediate part 26 and line 212a. Via these lines vessel 212 is filed with the starting gas. FIG. 2 also shows that the content of vessel 205 is discharged via line 205b, the channels 31 in flange 28, the channels 29 in intermediate part 26 and line 105 to heat exchanger 107. The heated and pressurised gas as discharged via line 106 is subsequently returned to said vessel 205 via lines 106, the channels 30 in flange 27, the channels 29 in intermediate part 26 and line 205a. FIG. 2 also shows how part of the content of vessel 206 is discharged as the compressed gas via line 108 via line 206b, the channels 30 in flange 27 and the channel 29 in intermediate part 26. The remaining compressed gas in vessel 206 is used as driving gas in a next rotational position of intermediate part 26, thereby connecting the outlet of vessel 206 via line 206b, the channels 30 of flange 27, channel 29 of intermediate part 26 and a supply line to another vessel (not shown in FIG. 2). FIG. 2 also shows how vessel 211 is emptied from any remaining driving gas by flushing with a purging gas supplied via line 124, channels 13 in flange 28, a channel 29 in intermediate part 26 and line 211a. The remaining driving gas and the purging gas are discharged from vessel 211 via lines 211b, channels 30 in flange 27 and line 109. By rotating the moveable part 26 to a next position different connections are made such that the vessels of the configuration move up one stage until they reach the final stage after which they start again at stage 1. Suitably every vessel of the configuration will pass all states per full rotation of the intermediate part 24. Thus a vessel will return to its initial state when the intermediate part 26 is rotated 360°.

The distributor 24 of FIG. 2 can be scaled up for a larger capacity. At a certain capacity the distributor will become too large to efficiently distribute the gasses as explained above. In such a situation it may be advantageous to scale up the vessels, such as the vessels 107, 211, 205, 212 and 206 as shown in FIG. 2, and use multiple distributors 24 operating in parallel and in synchronisation with each other. In that manner one larger vessel is connected to another larger vessel via more than one distributor at one moment in time. The vessels are thus interconnected via more than one distributor and the distributors are configured in parallel relative to each other.

The invention is also directed to a process to generate electrical power by means of a gas turbine, wherein said gas turbine uses a fuel and compressed oxygen comprising gas as feed and wherein the following steps are performed, (a) compressing an oxygen comprising gas by means of a compressor,
(b) further compressing said oxygen containing gas by means of a process as described above,
(c) combusting the fuel with the compressed oxygen containing gas obtained in step (b) to obtain a pressurised combustion gas and
(d) expanding said combustion gas in an expander of a gas turbine generating electrical power.

Preferably a stream of expanded flue gas is obtained in step (d) and wherein this flue gas is used to increase the temperature of the compressed oxygen gas by means of indirect heat exchange prior to performing step (c).

Preferably step (b) is performed by compressing said oxygen containing gas by means of a process according to the present invention, and wherein the remaining driving gas is combined with the flue gas after being reduced in temperature by means of the heat exchange and wherein the resulting combined gas flow is used as the fluid having a higher temperature in step (i). Preferably the combined gas flow is increased in caloric value prior to be used as the fluid having a higher temperature in step (i) by mixing said combined gas flow with an exhaust gas of another process or by combusting an additional fuel. The additional fuel may be any gaseous, liquid or solid fuel, such as for example natural gas, synthesis gas, hydrogen, refinery off-gas, a biomass solid, such as wood, a domestic waste fuel and crude oil derived fuel, e.g. kerosene, diesel fuel or bunker fuel.

The fuel used in step (c) may suitably be the same as the above examples described for the additional fuel. Suitably the fuel used in step (c) is a gaseous or liquid fuel, such as for example natural gas, synthesis gas, hydrogen, refinery off-gas, and crude oil derived fuel, e.g. kerosene, diesel fuel or bunker fuel. Even more preferably the fuel is a gaseous fuel, suitably natural gas, synthesis gas, hydrogen and/or refinery off-gas.

The synthesis gas described above may be obtained by gasification of coal or residual fractions derived from a crude oil. The hydrogen may be obtained by subjecting synthesis gas, such as obtained by these gasification processes, to a water-gas shift reaction.

The compressor used in step (a) may be directly coupled to the expander of the gas turbine used in step (d) or preferably connected via a gear box to the expander. This is advantageous when the fluid having a higher temperature as used in the process comprises heated gasses obtained from another process. The compressor may also be driven independently from the gas turbine, for example an electrically driven compressor may be used. The mass flow of such, for example exhaust, gasses may vary and thus the capacity to increase the pressure and temperature may vary. By being able to control the compressor independently from the expander such variations can be compensated for in an easier manner.

Figure 3:
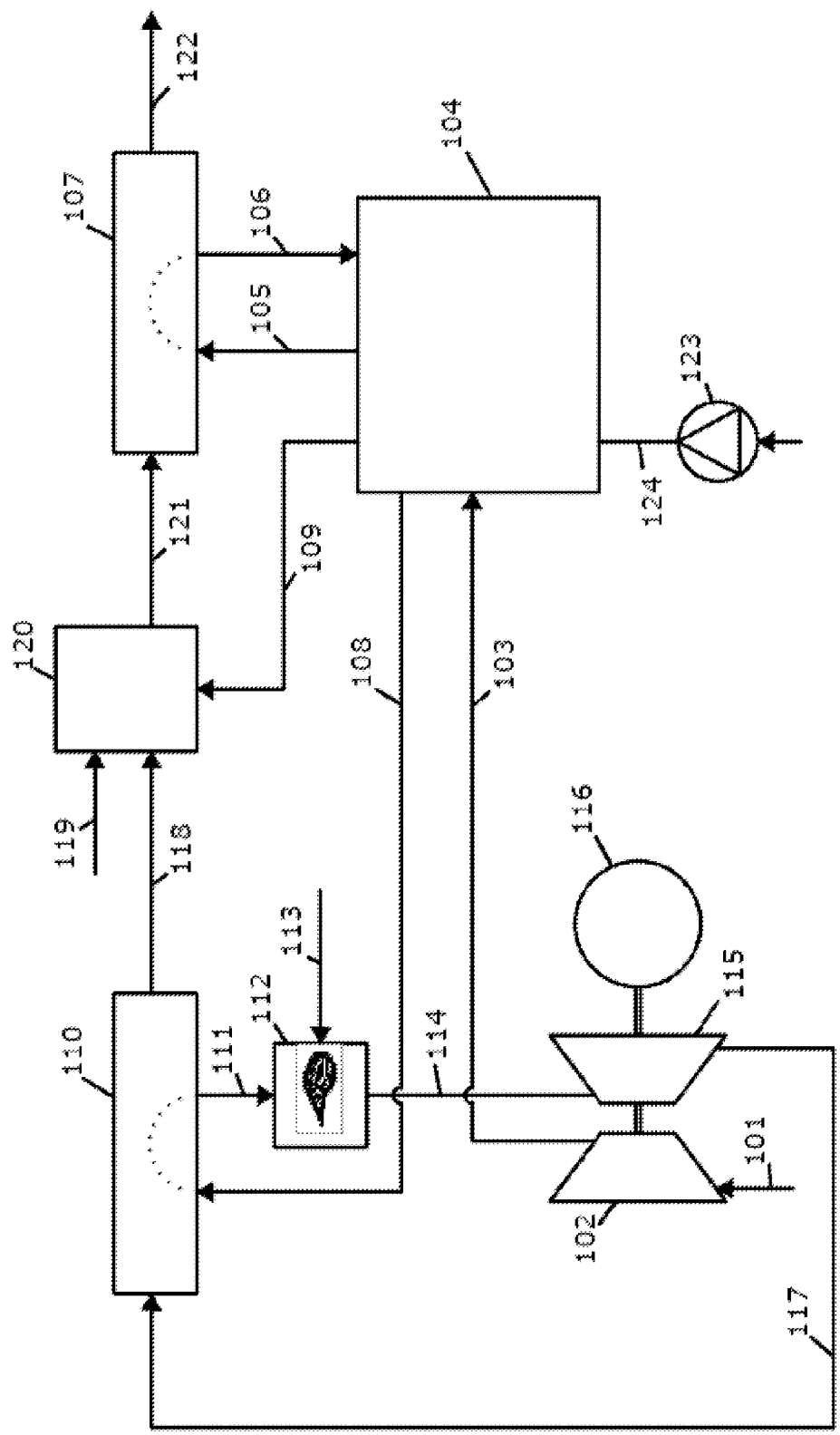
FIG. 3 shows a process flow scheme of a process to generate energy according to the invention.

The above process will be illustrated by FIG. 3. To a compressor 102 an oxygen comprising gas 101, for example air, is supplied to obtain a partly compressed flow 103. This partly compressed gas flow 103 is further compressed in a configuration 104 of FIG. 2. In FIG. 3 this configuration 104 is not drawn in detail for clarity reasons. FIG. 3 shows flow lines 105 and 106 for transport of the contents of a vessel in State (n+2) to and from a heat exchanger 107. Through line 108 a flow of the resulting gas high in temperature and pressure is discharged from a vessel of configuration 104. To empty the vessel from any remaining driving gas just before fresh gas 103 is provided a fan 123 is used to which intake air pushes the remaining driving gas as flow 124 from configuration 104 as flow 109.

The gas 108 is further increased in temperature in heat exchanger 110 to obtain a heated gas 111. The compressed and heated oxygen in heated gas 111 is used to combust a fuel 113 in a combustor 112 to obtain a pressurised combustion gas 114. The pressurised combustion gas 114 is expanded in expander 115 to generate power, e.g. electricity by operating a generator 116. The stream of expanded flue gas 117 thus obtained has a high temperature level and is used a heating in heat exchanger 110 thereby obtaining a stream of exhaust gas 118 having a lower temperature. In FIG. 3 this exhaust gas 118 is combined with the remaining driving gas 109 and with a flow 119, which may be the exhaust gas of another process in mixer 120. The resulting combined flow 121 is used as the fluid having a higher temperature in heat exchanger 107.

The below table illustrates a working example of the process of FIG. 3.

| Flow number in FIG. 3 | Temperature (° C.) | Mass flow (kg/s) | Pressure (bara) | Energy flow (kJ/s) |
|---|---|---|---|---|
| 101 | 20 | 6,190 | 1 | 124 |
| 103 | 62 | 6,190 | 1.5 | 389 |
| 105 | 185 | 32,315 | 3.3 | 3499 |
| 106 | 230 | 32,315 | 4.3 | 7528 |
| 108 | 230 | 6,190 | 3.546 | 1442 |
| 109 | 230 | 12,805 | 1.74 | 2983 |
| 111 | 631 | 6,190 | 3.546 | 4113 |
| 114 | 951 | 6,252 | 3.546 | 6456 |
| 117 | 663 | 6,252 | 1.023 | 4376 |
| 118 | 265 | 6,252 | 1.017 | 1685 |
| 119 | | | | 1637 |
| 121 | 324 | 19,057 | 1.017 | 6306 |
| 122 | 118 | 19,057 | 1.013 | 2256 |

The power required for compressing the air flow is 264 kJ/s. The power generated in the expander is 2080 kJ/s. A 97% efficiency of the generator 116 is used to calculate the total efficiency. A net production of 1762 kJ/s electricity was found (after subtracting the energy required for running compressor 102). Based on the waste heat stream 119 a 75 w % efficiency is achieved. Thus a very efficient manner of regaining energy from a waste heat stream is illustrated. This efficiency can be further increased by making efficient use of the heat still present in stream 122, for example for making warm water, for e.g. central heating, by indirect heat exchange against this stream 122.

The invention claimed is:

1. A process to obtain a compressed gas starting from a starting gas having a lower pressure by performing the following steps: (i) increasing the pressure and temperature of a gas having an intermediate pressure by means of indirect heat exchange against a fluid having a higher temperature to obtain a gas high in pressure and temperature (ii) obtaining part of the gas high in temperature and pressure as the compressed gas, (iii) using another part of the gas high in temperature and pressure as a driving gas to increase the pressure of the starting gas in one or more stages to obtain the gas having an intermediate pressure for use in step (i), wherein the pressure of the starting gas is increased in step (iii) in n levelling stages, wherein n is 2 or more and wherein part of the driving gas is added to the gas obtained in the (n−1)th levelling stage to increase the pressure of said gas in the n th levelling stage to obtain the gas having an intermediate pressure and wherein part of the remaining driving gas is added to the gas obtained in the (n−2)th levelling stage in the (n−1)th levelling stage and continuing said sequence of adding part of the remaining driving gas to the gas obtained in the previous stage for the remaining (n−2) levelling stages and adding the then remaining driving gas to the starting gas in the first levelling stage.

2. The process according to claim 1, wherein driving gas remains after performing the first levelling stage and wherein said remaining driving gas is discharged.

3. The process according to claim 1, wherein n is between 2 and 50.

4. The process according to claim 3, wherein n is from 4 to and including 50.

5. The process according to claim 1, wherein steps (i)-(iii) are continuously repeated to obtain a continuous flow of compressed gas.

6. The process according to claim 5, wherein one cycle of steps (i)-(iii) is performed between 1 and 2000 times per minute.

7. The process according to claim 1, wherein the process is performed in a configuration of 2n+4 or more interconnected vessels, wherein n is the number of levelling stages, and wherein at least 2n+4 vessels are each in a different state, the different states are State 1 to State 2n+4 according to: State 1 is a filling state, State 2 to State (n+1) is a state wherein the content of the vessel increases in pressure by levelling, State (n+2) is a heat exchange state wherein step (i) of the process of the invention takes place, State (n+3) is a product gas discharge state wherein part of the vessel content is discharged according to step (ii) of the process and wherein a part of the vessel content remains in the vessel, State (n+4) to State (2n+3) are states wherein a part of the content of the vessel in State (n+4) to State (2n+3) is used to level with the vessels in State 2 to State (n+1) as in step (iii) of the process, and State (2n+4) wherein the remaining driving gas is discharged from the vessel.

8. The process according to claim 7, wherein State (n+4) to State (2n+3) are states wherein a part of the content of the vessel in State (n+4) to State (2n+3) is used to level with the vessels in State 2 to State (n+1) such that a vessel in State (n+4) will level with the vessel in State (n+1), the vessel in State (n=5) will level with the vessel in State (n), wherein this is repeated until the vessel in State (2n+3) levels with the vessel in State (2).

9. The process according to claim 8, wherein the vessels of the process continuously change their state from State 1 to State (2n+4) after which they return to State 1 to obtain a continuous flow of compressed gas.

10. The process according to claim 1, wherein in step (i) the fluid having a higher temperature is a (flue) gas having a temperature of between 100 and 600 degrees centigrade.

11. The process according to claim 1, wherein the compressed gas is an oxygen comprising gas for use as feed component of a combustor as part of a gas turbine.

12. A process to generate electrical power by means of a gas turbine, wherein said gas turbine uses a fuel and compressed oxygen comprising gas as feed and wherein the following steps are performed, (a) compressing an oxygen comprising gas by means of a compressor, (b) further compressing said oxygen containing gas by means of a process according to any one of claims 1 and 2-11, (c) combusting the fuel with the compressed oxygen containing gas obtained in step (b) to obtain a pressurised combustion gas and (d) expanding said combustion gas in an expander of a gas turbine generating electrical power.

13. The process according to claim 12, wherein a stream of expanded flue gas is obtained in step (d) and wherein this flue gas is used to increase the temperature of the compressed oxygen gas by means of indirect heat exchange prior to performing step (c).

14. The process according to claim 13, wherein step (b) is performed by compressing said oxygen containing gas by means of a process according to any one of claims 1-12, and wherein the remaining driving gas is combined with the flue gas after being reduced in temperature by means of the heat exchange and wherein the resulting combined gas flow is used as the fluid having a higher temperature in step (i).

15. The process according to claim 14, wherein the combined gas flow is increased in caloric value prior to be used as the fluid having a higher temperature in step (i) by mixing said combined gas flow with an exhaust gas of another process or by combusting an additional fuel.

16. The process according to claim 12, wherein the fuel is natural gas, synthesis gas, hydrogen, kerosene or diesel.

17. A configuration comprising 2n+4 or more interconnected vessels, wherein n is 2 or more, each vessel having an inlet and an outlet connected to a distributer, wherein the distributer is further provided with an inlet to receive a starting gas, an outlet to discharge a compressed gas, an inlet and outlet connected to an outlet and inlet of a heat exchanger, an outlet to discharge a remaining driving gas and an inlet to supply a purging gas, wherein the distributor fluidly connects:
the inlet to receive a starting gas to the inlet of a vessel of said configuration;
the outlet to discharge a compressed gas to the outlet of another vessel of said configuration;
the outlet and inlet of the heat exchanger to the outlet and inlet of another vessel of said configuration;
the outlet to discharge a remaining driving gas to the outlet of another vessel of said configuration;
at least one outlet of one other vessel of said configuration to an inlet of another vessel of said configuration.

18. The configuration according to claim 17, wherein the distributor is comprised of an intermediate part and two end flanges at its two opposite ends, wherein the intermediate part is provided with channels and wherein the intermediate part is rotationally moveable relative to the two end flanges, wherein the first and second flanges are provided with channels connected to the inlet and outlets of the distributor and wherein part of the channels of a flange communicate with other channels of the same flange via the channels present in the intermediate part at a certain rotational position of the intermediate member relative to the flange.

19. The configuration according to claim 17, wherein the 2n+4 or more vessels are interconnected via more than one distributor and wherein the distributors are configured in parallel relative to each other.

* * * * *